May 17, 1949.　　　　　A. J. LEVIN　　　　2,470,313
ACCELERATED VARIABLE BUOYANCY LIFT
Filed March 26, 1948　　　　　　　　　　　2 Sheets-Sheet 1

INVENTOR.
ABRAHAM J. LEVIN.
BY
*Robert A. Sloman*
ATTORNEY.

May 17, 1949.  A. J. LEVIN  2,470,313
ACCELERATED VARIABLE BUOYANCY LIFT

Filed March 26, 1948  2 Sheets-Sheet 2

INVENTOR.
ABRAHAM J. LEVIN.
BY
Robert A. Sloman
ATTORNEY.

Patented May 17, 1949

2,470,313

UNITED STATES PATENT OFFICE 2,470,313

ACCELERATED VARIABLE BUOYANCY LIFT

Abraham J. Levin, Franklin, Mich.

Application March 26, 1948, Serial No. 17,297

7 Claims. (Cl. 253—1)

This invention relates to a means for producing a mechanical movement, and more particularly to a fluid mechanism for producing mechanical movements.

It is the principal object of this invention to provide a structure adapted to utilize the reserve buoyancy of objects partially or wholly immersed within a fluid.

It is the further object of this invention to provide a means for regulating and increasing such reserve buoyancy whereby the latter may be employed to do useful work as in the transmission or transportation of fluids from one point to another, and for other hydrodynamic purposes.

It is the further object of this invention to provide means for creating or increasing the reserve buoyancy of a fluid container to thereby elevate the same relative to the level of a body of fluid artificially creating a fluid pressure head which is available for any number of purposes, as for instance for use in supplying fluid for irrigation, or for hydrodynamic purposes.

It is the still further object of this invention to provide a structure for creating an initial reserve buoyancy of an object together with means for increasing said reserve buoyancy, as well as secondary means for still further increasing said reserve buoyancy.

These and other objects will be seen from the following specification and claims in conjunction with the appended drawings in which:

Figure 1:
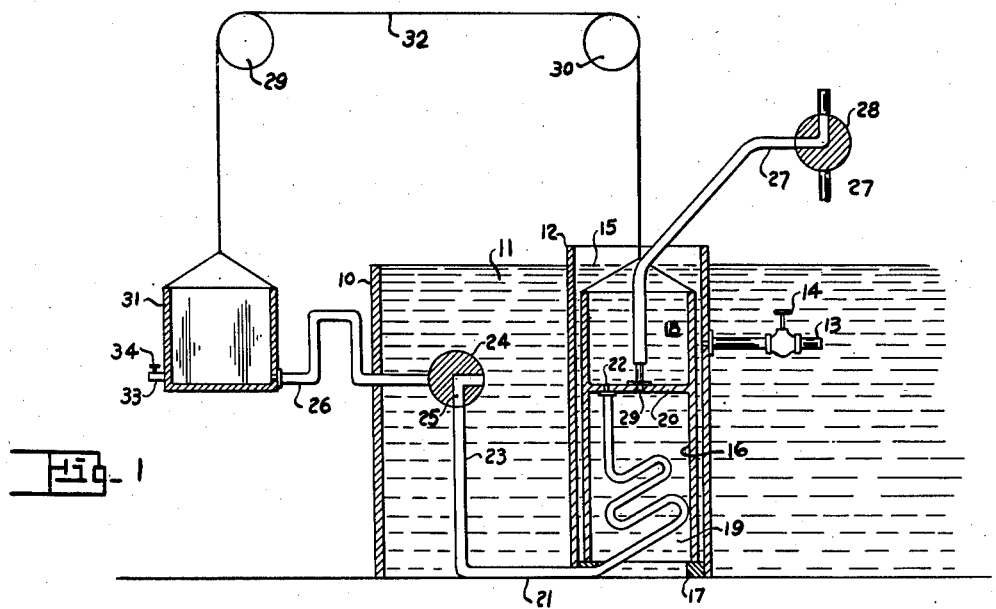
Fig. 1 is a partially diagrammatic elevational section of one embodiment of the present invention.

It will be understood that the above drawings illustrate merely a preferable embodiment of the invention by way of illustration only, and that other embodiments are contemplated within the scope of the claims hereafter set out.

Referring to the drawing a body of fluid 11 such as water is shown within the fluid container 10. The substantially upright hollow cylindrical container or housing 12 which is preferably open-ended is substantially submerged within fluid 11.

Fluid inlet pipe 13 with hand valve 14 is joined to housing 12 below the water level for communication with the interior thereof, whereby with said valve open the fluid 15 within housing 12 will assume the level of fluid 11 on the exterior of said housing.

A second substantially hollow housing 16 preferably open-ended is coaxially positioned within housing 12, being submerged therein as shown in Fig. 1, with its lower annular edge bearing upon the annular flange 17 which forms a part of housing 12.

Housing 16 is divided into chambers 18 and 19 by means of the intermediate partition 20 therein so that the compartment 18 has substantially one-half the volume of compartment or chamber 19 by way of illustration.

Figure 2:
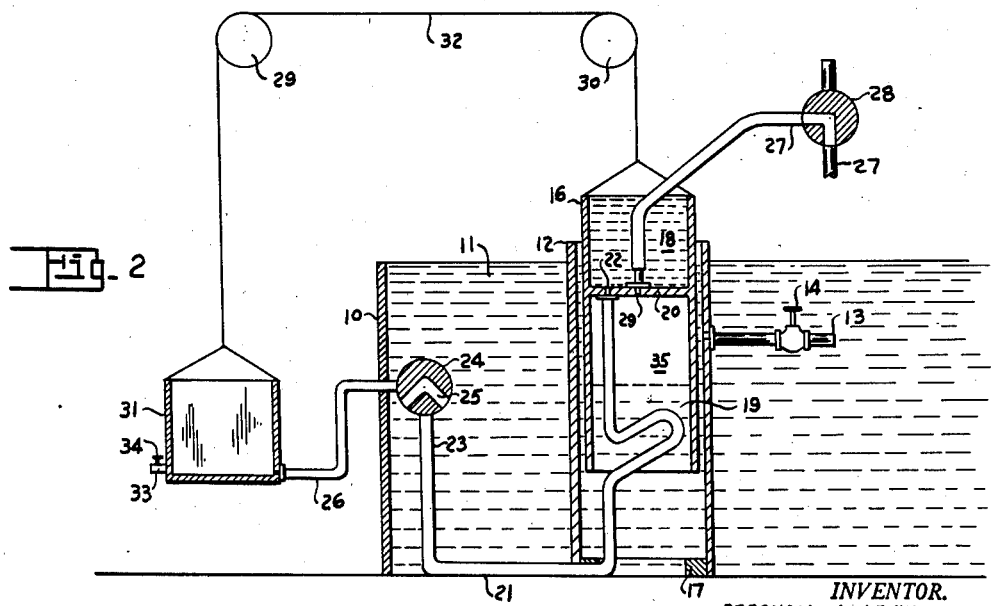
Fig. 2 is a similar view illustrating the relative position of the elements in said embodiment under a change of conditions.
Figure 3:
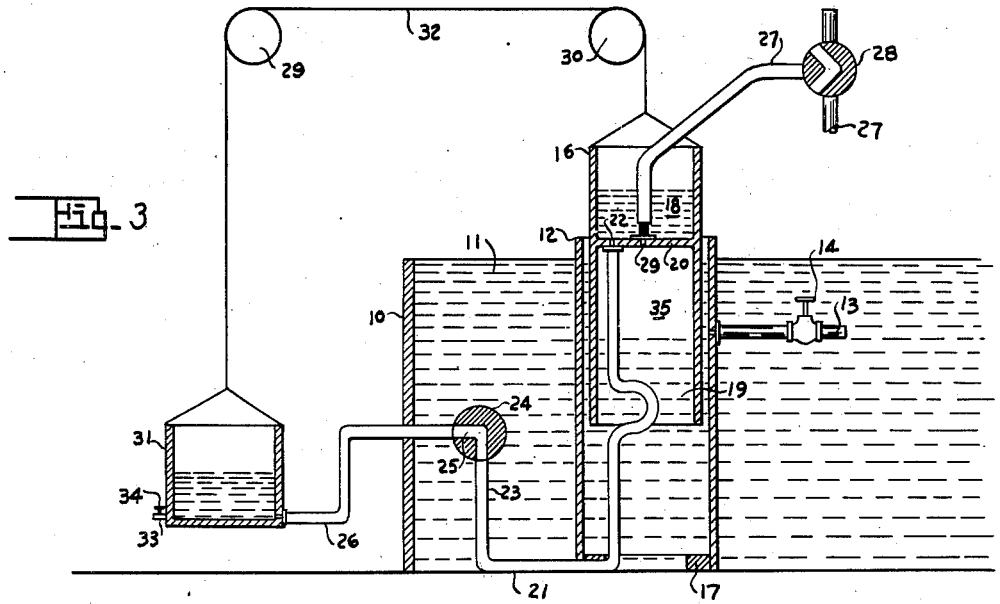
Fig. 3 is a similar view illustrating the relative position of the elements under a further change of conditions.
Figure 4:
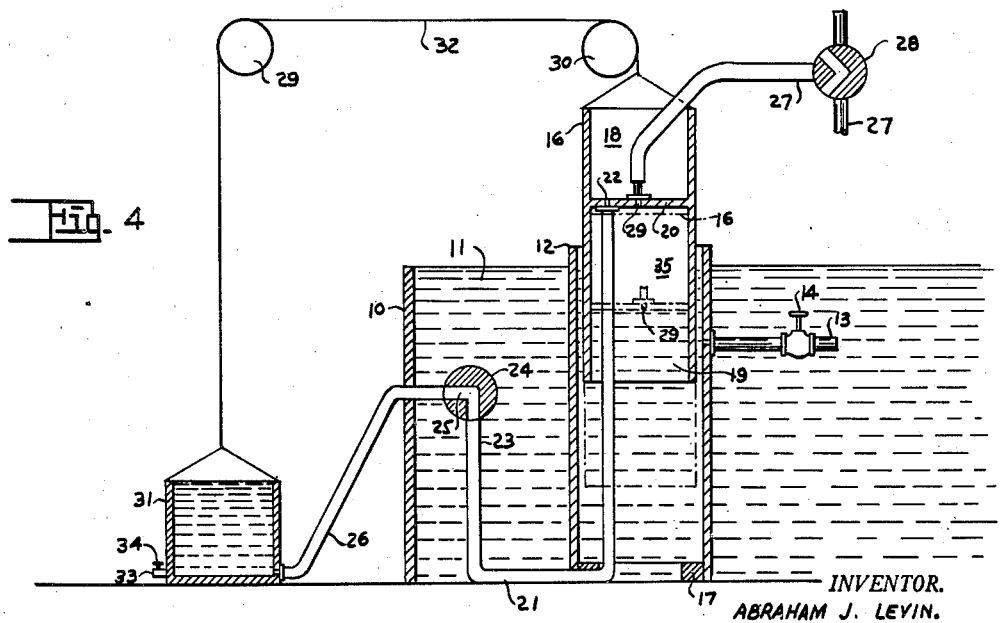
Fig. 4 is a similar view illustrating the relative position of the elements under a still further change of conditions.

Housing 16 which is adapted for vertical reciprocal movements within housing 12 as shown in Figs. 2, 3 and 4, has joined thereto the flexible conduit 21 whose inner end is suitably joined to partition 20 in registry with opening 22 therethrough, providing fluid communication at the lower end of and within chamber 18 which forms the upper part of housing 16.

The other end of conduit 21 extends loosely thru the lower open end of compartment 19 and thru a corresponding opening in the outer housing 12, where it joins at point 23 two-way valve 24 diagrammatically shown, and which is positioned within the fluid 11 in container 10.

The valve element 24 has a passage 25 therein whose outer end is adapted for communication either with the fluid 11 or upon rotation thereof is adapted for communication with fluid delivery pipe 26, for supplying fluid, as for instance for purposes of irrigation, by way of illustration. It will be understood that the fluid available in pipe 26 may be used for other hydrodynamic purposes.

Two-way valve 24 is normally controlled manually or mechanically for providing fluid communication between delivery pipe 26 and the interior of chamber 18, or on the other hand for providing communication between compartment 18 and the body of fluid 11.

A second flexible pipe or conduit 27 with 2-way valve 28 interposed is adapted for connection at its outer end to a source of compressed air or other gaseous substance while its other end is joined to the partition 20 within housing 16 for registry with opening 29 therethrough, providing communication to the interior of compartment 19, which forms a part of housing 16.

A pair of spaced pulleys 29 and 30 are diagrammatically indicated, being arranged in spaced relation. A suitable cord 32 or other connecting means interconnects housing 16 at one end of said cord with the fluid container 31 secured upon the other end of said cord.

Consequently container 31 as well as housing 16 are suspended in spaced relation to each other by the cord or wire 32 which extends over said pulleys.

Fluid delivery pipe 26 extends from 2-way valve 24 with its outer end joined to and in communication with the interior of container 31 at its lower end. A drain pipe 33 projects from the opposite side of said container, there being a hand valve 34 joined to said drain pipe to control the withdrawing of fluid from container 31 as desired.

Operation

The operation of the above described apparatus is respectively shown in Figs. 1, 2, 3, and 4 of the drawings, illustrating the various relative positions of housing 16 and container 31 under varying conditions.

In Fig. 1 valve 14 is open providing fluid communication to the interior compartment 15 of housing 12 whereby the fluid therein is at the same level as the body of fluid 11.

In Fig. 1 the hand valve 24 is adjusted so that its passage 25 establishes fluid communication between conduit 21 and the fluid 11 within container 10. With chamber 18 only partially submerged within the fluid in housing 12, i. e. below the level of fluid 11, it is clear that chamber 18 will automatically fill with fluid and housing 16 will be completely submerged as shown in Fig. 1.

The hand valve 28 which is preferably a 2-way valve is momentarily opened permitting the inlet of compressed air into the lower compartment 19 of housing 16, said body of air being entrapped below partition 20, and designated by the numeral 35.

This cylindrical column of air 35 has the effect of increasing the reserve buoyancy of housing 16 causing the same to rise upwardly within housing 12 to the position shown in Fig. 2, and with the fluid within the upper chamber 18 of housing 16 being elevated to the position shown.

Thus an artificial pressure head has been created for this fluid relative to the normal fluid level of fluid 11, with housing 16 and its partition 20 being supported by the entrapped cylindrical body of compressed air 35.

The introduction of compressed air into compartment 19 which is interposed between the fluid therein and partition 20 is one means of artificially creating a reserve buoyancy for the inner housing 16 causing the same to attain the upright floating position within the body of fluid 11, and more particularly within housing 12 which serves essentially as a guide therefor.

It is contemplated that other means may be employed for creating this reserve buoyancy as for instance the use of a weight or other mechanical means, to function in the manner hereafter described with respect to means for increasing reserve buoyancy.

In Fig. 1 container 31 is substantially level with chamber 18, whereas with a latter elevated as in Fig. 2, and in view of the pulley connections, container 31 has dropped to the position shown.

The head of fluid within compartment 18 has now been increased relative to container 31 by virtue of its elevation to the position shown in Fig. 2, with said head being further increased by the corresponding downward movement of container 31.

Referring now to Fig. 3 the 2-way valve 24 is adjusted so that its passage 25 establishes fluid communication between conduit 21 and delivery pipe 26, and due to the head of fluid in chamber 18, said fluid will begin to drain into container 31 in the manner indicated in Fig. 3.

The fluid which is supplied to container 31 may be employed for a number of purposes as for instance, irrigation, or on the other hand may be drained from pipe 33 of container 34 for various hydrodynamic purposes.

As shown in Fig. 3 approximately one-half of the fluid has drained from chamber 18 and into container 31 with the result that the net weight of the remaining fluid in chamber 18 and the weight of housing 16 has been reduced so that with the column of air 35 remaining constant, its buoyant effect has been increased, and housing 16 has risen to a higher position, as compared with Fig. 2.

At the same time the fluid so drained has begun to fill container 31 adding to the weight of said container, all of which transmits a downward force thru the supporting cord 32 for container 31. In view of pulleys 29 and 30 the downward thrust due to the increased weight of container 31 and the fluid therein is transmitted thru the wire or cord 32 effecting an upward thrust to the portion thereof which supports housing 16.

As above described the initial withdrawing of fluid from chamber 18 has the effect of increasing the reserve buoyancy of housing 16 causing it to rise to the position shown in Fig. 3 as well as the intermediate positions, as fluid has been withdrawn from chamber 18.

The upward thrust from container 31 now has an additional lifting effect for housing 16, in acting as a counterbalance therefor so that the buoyant effect of the column of air 35 has been still further increased, causing continued upward movement of housing 16 to the position shown in Fig. 4, where all the fluid has finally been withdrawn from chamber 18.

The withdrawal of fluid initially from chamber 18 has thus had the effect of increasing the reserve buoyancy of housing 16 thereby controlling upward movement thereof within the body of water shown. The reserve buoyancy of housing 16 is consequently further increased by utilizing the weight of the fluid withdrawn from chamber 18 whereby there are two forces at work tending to increase the reserve buoyancy of housing 16 as chamber 18 is gradually drained.

As shown in Fig. 4 all the fluid has drained from chamber 18, container 31 is full substantially, is in its lowest position while housing 16 is at its uppermost position.

The fluid within container 31 may now be utilized for a further useful purpose such as for irrigation, or some hydrodynamic purpose by withdrawing the same thru drain pipe 33, the flow therethrough being controlled by hand valve 34.

With container 31 completely drained the upward thrust upon housing 16 is reduced by the weight of the fluid drained from container 31, however in view of the remaining reserve buoyancy of housing 16 due to the column of air 35, it is clear that said housing will still be in an elevated position relative to Fig. 2.

To complete the cycle of operation the 2-way valve 28 is manually or otherwise adjusted to permit the escape of some or all of the air 35 within chamber 19 with the result that housing 16 will drop substantially to the dotted line position thereof shown in Fig. 4.

2-way valve 24 is then adjusted to the position shown in Fig. 1 and fluid communication will again be established between chamber 18 and the fluid 11, so that chamber 18 will gradually refill and be submerged to the initial position shown in Fig. 1.

In connection with Fig. 4 it was explained that valve 28 was adapted to permit the escape of air 35 thru pipe 27. It is contemplated that it may not be necessary to permit the escape of all such air, but just a sufficient amount as will permit the fall of container 16, with the remaining shortened column of air 35 being partially compressed.

It is contemplated that the compressed air which is permitted to escape may be utilized, if desired, for a useful purpose.

Drain pipe 21 is shown as the preferred means for delivering fluid from chamber 18 to container 31, however said fluid may be siphoned therefrom if desired, and drained into container 31.

As above described in applicant's preferable embodiment a source of compressed air is employed to create the reserve buoyancy described. On the other hand any gaseous substance could be employed.

It is contemplated however that other means may also be employed for creating a reserve buoyancy, as for instance a weight and pulley as above described, or a lever, or any other mechanical means adapted to upset the initial equilibrium of fluid so as to cause container 16 with a quantity of fluid to be elevated above the normal level of fluid 11 to create a head of fluid.

While said reserve buoyancy may be created by the operation of a weight and pulley, a lever, or other mechanical means, it follows further that the release of said weight and pulley, lever or other mechanical means would correspond to the release of air from chamber 19 to thereby decrease said reserve buoyancy.

Having described my invention, reference should now be had to the claims which follow for determining the scope thereof.

I claim:

1. In combination, an open-ended upright partitioned housing immersed in a fluid body and having upper and lower chambers, a compressed air supply conduit in communication with the lower chamber, a fluid container, a plurality of pulleys, means interconnecting said housing and container suspending the same from said pulleys in spaced relation, a conduit providing communication between said upper chamber and container, valve means in said air conduit controlling the flow of air into said lower chamber entrapping a column of air therein to develop a reserve buoyancy in said housing causing said upper chamber to rise above said container creating a head for the fluid in said upper chamber relative to said container, valve means in said fluid conduit controlling the flow of fluid between said upper chamber and container, and adapted to alternately establish communication between said upper chamber and said body of fluid, and a fluid escape valve adjacent the bottom of said container.

2. In combination, an open-ended upright partitioned housing immersed in a fluid body and having upper and lower chambers, a compressed air supply conduit in communication with the lower chamber, valve means in said air conduit controlling the flow of air into said lower chamber, a fluid container, a plurality of pulleys, means interconnecting said housing and container suspending the same from said pulleys in spaced relation, a conduit providing fluid communication between said upper chamber and container, valve means in said latter conduit controlling the flow of fluid between said upper chamber and container and adapted to alternately establish communication between said upper chamber and fluid body, and a fluid escape valve adjacent the lower end of said container.

3. In combination, an open-ended upright partitioned housing immersed in a fluid body and having upper and lower chambers, a compressed air supply conduit in communication with the lower chamber, a fluid container, a plurality of pulleys, means interconnecting said housing and container suspending the same from said pulleys in spaced relation, a conduit providing communication between said upper chamber and container, valve means in said air conduit controlling the flow of air into said lower chamber entrapping a column of air therein to develop a reserve buoyancy in said housing causing said upper chamber to rise above said container creating a head of fluid in said upper chamber relative to said container, valve means in said fluid conduit controlling the flow of fluid between said upper chamber and container and adapted to alternately establish communication between said upper chamber and said fluid body, the reserve buoyancy in said housing increasing as fluid flows from its upper chamber reducing its weight, and in view of the upward thrust of its suspending means due to the increased weight of said container, and a fluid escape valve adjacent the lower end of said container to permit the withdrawal of fluid therefrom.

4. In combination, an open-ended upright partitioned housing immersed in a fluid body and having upper and lower chambers, a compressed air supply conduit in communication with the lower chamber, a fluid container, a plurality of pulleys, means interconnecting said housing and container suspending the same from said pulleys in spaced relation, a conduit providing communication between said upper chamber and container, valve means in said air conduit controlling the flow of air into said lower chamber entrapping a column of air therein to develop a reserve buoyancy in said housing causing said upper chamber to rise above said container creating a head of fluid in said upper chamber relative to said container, valve means in said fluid conduit controlling the flow of fluid between said upper chamber and container and adapted to alternately establish communication between said upper chamber and said fluid body, and a valved outlet in said container to permit the withdrawal of the fluid therefrom, the valve means in said air conduit being adjustable to permit the escape of air from said lower chamber decreasing said reserve buoyancy, so that it descends into the fluid causing upward movement of the empty container.

5. In combination, an open-ended upright partitioned housing immersed in a fluid body and having upper and lower chambers, a compressed air conduit in communication with the lower chamber, a fluid container, a plurality of pulleys, means interconnecting said housing and container suspending the same from said pulleys in spaced relation, a conduit providing fluid communication between said upper chamber and container, valve means in said air conduit controlling the flow of air into said lower chamber entrapping a column of air therein to develop a reserve buoyancy in said housing causing said upper chamber to rise above said container creating a head of fluid in said upper chamber relative to said container, valve means in said fluid conduit controlling the flow of fluid between said upper chamber and container and adapted to alternately establish communication between said upper chamber and said fluid body, and a valved outlet in said container to permit the withdrawal of the fluid therefrom, the valve means in said air conduit being adjustable to permit the escape of air from said lower chamber decreasing said reserve buoyancy, so that it descends into the fluid causing upward movement of the empty container, the valve means in said fluid conduit being adjustable to establish communication between said fluid body and said upper chamber, whereby said housing is gradually submerged.

6. In combination, an object immersed in a body of fluid, a filled fluid receptacle carried thereby, a fluid container, a plurality of pulleys, means interconnecting said object and container suspending the same from said pulleys in spaced relation, means cooperable with said object to elevate the same and its fluid above the surrounding fluid level to create a reserve buoyancy in said object and a head relative to said container, a fluid conduit between said container and receptacle for conducting fluid from said receptacle increasing its reserve buoyancy and to said container for further increasing said reserve buoyancy a two-way valve in said conduit controlling the flow of fluid between said receptacle and said container and adapted to alternately establish communication between said receptacle and said body of fluid, and an outlet valve adjacent the bottom of said container to permit the withdrawal of fluid therefrom.

7. In combination, an object immersed in a body of fluid, a filled fluid receptacle carried thereby, a fluid container, a plurality of pulleys, means interconnecting said object and container suspending the same from said pulleys in spaced relation, means cooperable with said object to elevate the same and its fluid above the surrounding fluid level to create a reserve buoyancy in said object and a fluid head relative to said container, a fluid conduit between said container and receptacle for conducting fluid from said receptacle increasing its reserve buoyancy and to said container for further increasing said reserve buoyancy, said means being adapted to permit lowering of said object and receptacle to correspondingly decrease said reserve buoyancy a two-way valve in said conduit controlling the flow of fluid between said receptacle and said container and adapted to alternately establish communication between said receptacle and said body of fluid, and an outlet valve adjacent the bottom of said container to permit the withdrawal of fluid therefrom.

ABRAHAM J. LEVIN.

No references cited.